Dec. 29, 1953 H. N. BEVERIDGE 2,664,547

DELAY LINE DEVICE

Filed Feb. 17, 1950 2 Sheets-Sheet 1

INVENTOR
HAROLD N. BEVERIDGE
BY Elmer J. Gorn
ATTORNEY

Dec. 29, 1953 H. N. BEVERIDGE 2,664,547

DELAY LINE DEVICE

Filed Feb. 17, 1950 2 Sheets-Sheet 2

INVENTOR
HAROLD N. BEVERIDGE
BY Elmer J. Gorn
ATTORNEY

Patented Dec. 29, 1953

2,664,547

UNITED STATES PATENT OFFICE 2,664,547

DELAY LINE DEVICE

Harold N. Beveridge, Arlington, Mass., assignor to Raytheon Manufacturing Company, Newton, Mass., a corporation of Delaware Application February 17, 1950, Serial No. 144,813

6 Claims. (Cl. 333—30)

This invention relates to signal wave delay devices, and more particularly to short time delay lines having normally low acoustic attenuation.

In short time delay lines where attenuation is low, for example, in mercury delay lines, a signal introduced at the input and traveling to the output will be partially reflected by the output due to the inability to perfectly match the impedance of the output to the mercury. This reflected signal may then travel back to the input and be again reflected by the imperfect match of the input to the mercury and thence again travel to the output, producing another signal out and a partial reflection. The appearance of this triple delay signal at the output is undesirable since it may interfere with subsequent signals being passed through the delay line device.

Previously, various attempts have been made to increase the attenuation of the delay line device by the use of lossy delay mediums or the introduction of lossy substances into the mediums. However, such devices are to a large degree unsatisfactory since they are frequency sensitive and cause distortion in the signal.

This invention discloses a method of introducing an attenuation into the signal wave translation channel in such a way that no distortion is introduced into the signal. Furthermore, the attenuation remains constant throughout the useful range of frequencies.

More specifically, the invention comprises a signal wave translation channel which may be, for example, a sonic channel comprising mercury or any other desired medium such as oil or water. This medium has signal input and output means attached thereto for introducing a signal into said channel and extracting a signal therefrom. Positioned in said channel is an impedance discontinuity which may be, for example, a piece of glass. The impedance discontinuity is relatively slight since the impedance of glass is nearly that of mercury. A signal introduced into the delay channel by the input means impinges upon the glass discontinuity and is partially reflected and the remainder of the energy enters the glass. In order to obtain partial reflection, the angle of incidence of the signal wave in the channel upon the glass must be less than the critical angle; otherwise, substantially total reflection is produced. The partially reflected signal then travels through said delay channel to the output means.

Since only a small part of the signal is reflected by the glass, the signal arriving at the output means is considerably attenuated in comparison with the input signal. Thus, waves reflected from the output means upon traveling back to the input means are still further attenuated, and upon being partially reflected by the input means and traveling to the output means have then become sufficiently small as compared with the original signal that this triple path signal will not objectionably interfere with subsequent signals passing through the delay device. Thus, it may be seen that very short delay lines may be built having sufficient attenuation so that triple delay path signals are eliminated. Such a device becomes important when short time delays are required, for example, on the order of forty microseconds as might be used in a moving target indicator radar system having a pulse repetition rate on the order of 25,000 cycles per second.

Referring now to the drawings.

Figure 1:
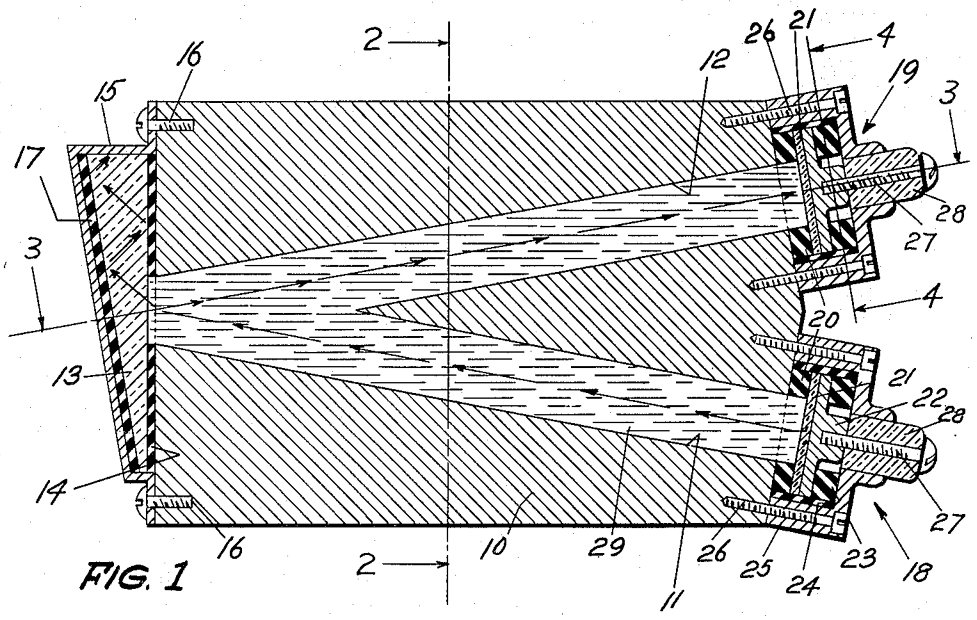
Fig. 1 illustrates a longitudinal, cross-sectional view of a device embodying this invention taken along line 1—1 of Fig. 2.
Figure 2:
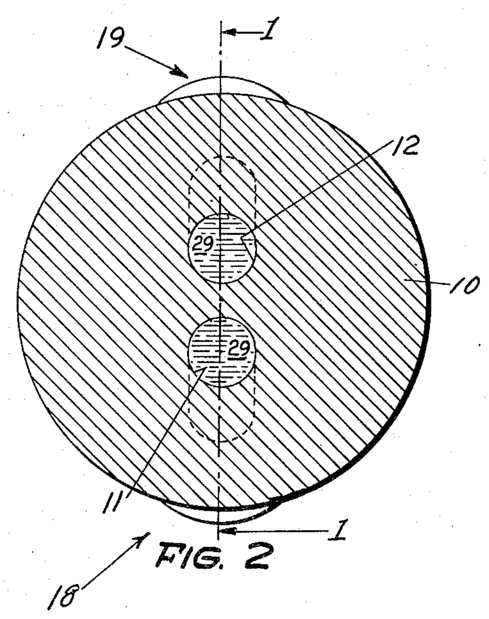
Fig. 2 is a transverse, cross-section of the device shown in Fig. 1 taken along line 2—2 of Fig. 1.
Figure 3:
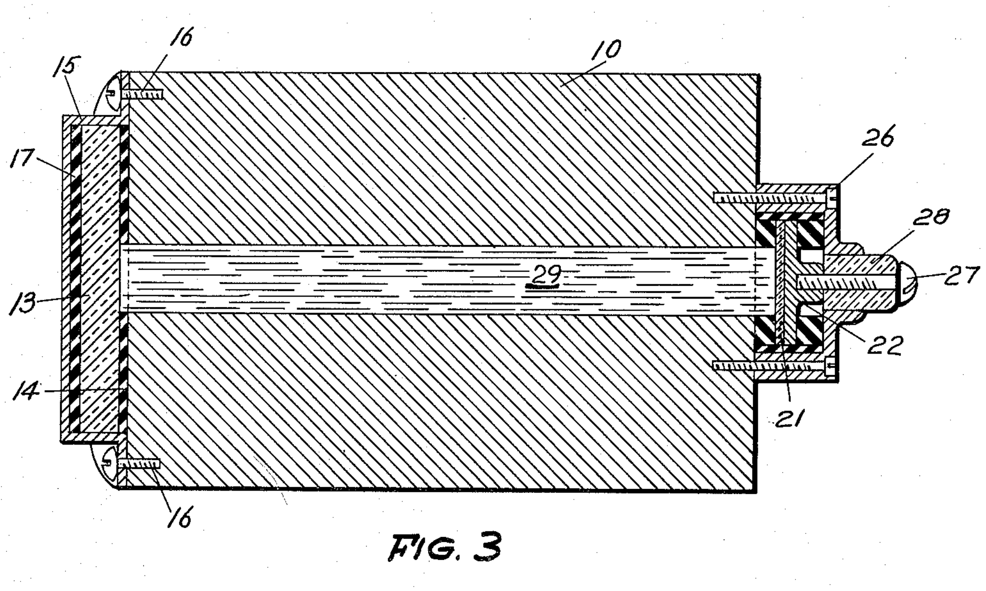
Fig. 3 is a substantially longitudinal, cross-section of the device shown in Fig. 1 taken along line 3—3 of Fig. 1.
Figure 4:
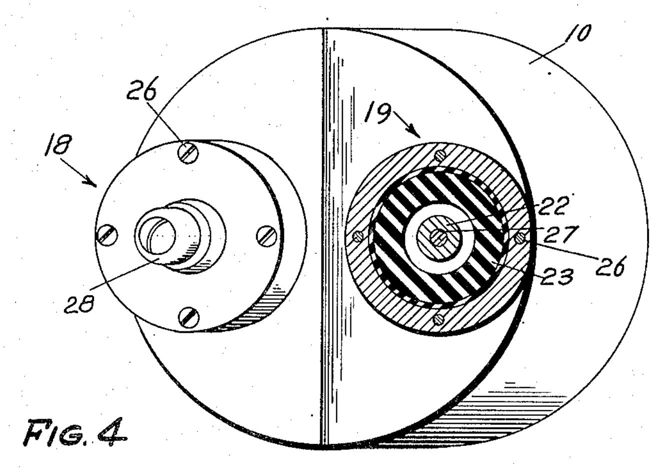
Fig. 4 is a partial, cross-sectional view of the device shown in Fig. 1 taken along line 4—4 of Fig. 1 and showing the details of the signal output transducer.

Referring now to Figs. 1 through 4, there is shown a cylindrical metal container 10 having a pair of cylindrical holes 11 and 12 cut substantially longitudinally therethrough. The axes of holes 11 and 12 lie in the same plane as the axis of block 10 and intersect the axis of block 10 at one end of the block. The result is a channel in the block 10 which is V-shaped. At the apex of the V, there is positioned against the end of block 10 a reflecting block 13. A fluid-tight seal is produced between the reflecting block 13 and metal block 10 by a rubber gasket 14 positioned therebetween and having a hole therein which conforms to the opening in the adjacent end of metal block 10 produced by holes 11 and 12. Block 13 is rigidly held with respect to metal block 10 by a clamp 15 which fits over block 13 and is attached to block 10 by screws 16, thereby compressing a second rubber member 17 positioned between clamp 15 and block 13. The legs of the V formed by holes 11 and 12 extend through metal block 10 and engage input and output transducers 18 and 19, respectively.

Transducers 18 and 19, as shown here, are identical, and may be, for example, of the crystal type which may be constructed as follows. Positioned against the end of one of the holes, for example, input channel hole 11, is a rubber gasket 20 having a hole therein conforming with hole 11. Adjacent gasket 20 is crystal element 21 which may be any piezo-electric crystal such as, for example, a quartz crystal. Positioned against crystal element 21, and on the opposite side thereof from gasket 20, is a metallic backing member 22, and positioned against metallic member 22 is another rubber gasket 23. Surrounding rubber gasket 20, crystal 21, metallic member 22, and rubber gasket 23 is a cylindrical rubber gasket 24, and enclosing the entire aforesaid assembly is a metal cap member 25 which is rigidly attached to metal block 10 by screws 26, thereby producing a fluid-tight seal. Cap member 25 engages rubber gasket 23, thereby rigidly holding metallic backing member 22 against crystal 21 to produce good electrical contact therewith.

An electrical lead-in screw 27 extends through cap member 25 and is insulated therefrom by means of an insulating bushing 28, said lead-in screw 27 threadedly engaging metallic backing member 22. Holes 11 and 12 in this modification will be filled with a conductive fluid such as mercury so that a signal potential applied between lead-in screw 27 and block 10 will be impressed through block 10 and mercury 29 to one side of crystal 21, and through lead-in screw 27 and metallic backing member 22 to the other side of crystal member 21, thereby producing mechanical vibrations of crystal 21.

Mechanical vibrations of crystal 21 produce a compressional wave signal in the mercury medium 29, said compressional wave signal traveling through the mercury medium 29 in hole 11 and impinging upon the block 13. The surface between the mercury and the block 13 which may be, for example, glass, is extremely smooth such that the mercury intimately contacts the glass surface. If the glass surface were rough or not uniform, the mercury would not intimately contact the glass surface but would rather produce partial contact therewith with minute voids between the contacting points. This lack of intimate contact would cause almost complete reflection of the incident signal. However, with a finely polished surface, the majority of the signal in the mercury will pass into the glass since the impedance of the glass is very nearly equal to the impedance of the mercury.

The amount of reflected power may be computed from the well-known formula $$P_r = P_i\left(\frac{Z_2 - Z_1}{Z_2 + Z_1}\right)^2$$

where $P_r$ is equal to the power reflected,
$P_i$ is equal to the incident power,
$Z_2$ is equal to the sonic impedance of the glass, and
$Z_1$ is equal to the sonic impedance of the mercury.

In addition, the angle of incidence of the signal wave in the mercury on the glass block must be less than the critical angle of incidence for the majority of the signal to pass into the glass and be merely refracted by the mercury glass interface where the angle of incidence is defined as the angle between the incident wave and an intersecting line which is normal to the glass surface. The critical angle as used throughout the specification and claims is defined as the particular angle of incidence whereat the incident wave is neither substantially reflected nor refracted but rather moves parallel to the surface of the discontinuity after incidence thereon. The critical angle for mercury and glass is on the order of fifteen degrees. Similarly, if a steel reflecting block were used in place of block 13, the critical angle would be on the order of fifteen to twenty degrees. These values will vary for different types of glass or steel and vary as a function of the sonic velocity in the materials.

The energy which travels into the glass block 13 is absorbed thereby. In order to prevent initial reflection, from the face of the glass block opposite the glass mercury interface, back through the glass into the mercury, the face of the block 13 opposite the mercury glass interface is slanted with respect to the mercury glass interface such that waves incident on the slanted surface are reflected away from the mercury glass interface and rather impinge upon the rubber sealing gasket 14.

The energy reflected from the mercury glass interface travels through hole 12 in the mercury medium 29 and impinges upon the crystal element of the output transducer 19 which is similar to the input transducer. Since this output signal is highly attenuated, due to the low reflection by the mercury glass interface, triple delay path signals are attenuated so much that they will not interfere with the main signals.

This completes the description of the specific embodiment described herein. However, many modifications thereof will be apparent to persons skilled in the art without departing from the spirit and scope of this invention. For example, other containers besides a metal block could be used in place thereof. Other energy absorbing and reflecting materials could be used in place of glass block 13. Other types of signal translation mediums could be used in place of mercury 29, and other types of transducers such as magnetostrictive or electrodynamic transducers could be used in place of transducers 18 and 19. Indeed, the invention is not necessarily limited to sonic signals, but may also be used for electromagnetic energy translation systems. Therefore, applicant does not wish to be limited to the particular details of the invention described herein except as defined by the appended claims.

What is claimed is:

1. A signal translation device comprising a confined signal wave translation channel having signal input means cooperating therewith, a discontinuity positioned in said channel, said discontinuity having an impedance which differs from the characteristic impedance of said channel by an amount sufficiently small to permit substantial transfer of energy through said discontinuity, the angle of incidence of signal waves traveling in said channel to said discontinuity being less than the critical angle, and output means cooperating with said channel and adapted to be energized by signals reflected from said discontinuity.

2. A signal translation device comprising a confined sonic signal wave translation channel having signal input means cooperating therewith, a discontinuity positioned in said channel, said discontinuity having an impedance which differs from the characteristic impedance of said channel by an amount sufficiently small to permit substantial transfer of energy through said discontinuity, the angle of incidence of signal waves traveling in said channel to said discontinuity being less than the critical angle, and output means cooperating with said channel and adapted to be energized by signals reflected from said discontinuity.

3. A signal translation device comprising a confined signal wave translation channel having signal input means cooperating therewith, a discontinuity comprising signal absorbing material positioned in said channel, said discontinuity having an impedance which differs from the characteristic impedance of said channel by an amount sufficiently small to permit substantial transfer of energy through said discontinuity, the angle of incidence of signal waves traveling in said channel to said discontinuity being less than the critical angle, and output means cooperating with said channel and adapted to be energized by signals reflected from said discontinuity.

4. A signal translation device comprising a confined sonic signal wave translation channel having signal input means cooperating therewith, a discontinuity comprising signal absorbing material positioned in said channel, said discontinuity having an impedance which differs from the characteristic impedance of said channel by an amount sufficiently small to permit substantial transfer of energy through said discontinuity, the angle of incidence of signal waves traveling in said channel to said discontinuity being less than the critical angle, and output means cooperating with said channel and adapted to be energized by signals reflected from said discontinuity.

5. A signal translation device comprising a confined signal wave translation channel comprising mercury having signal input means cooperating therewith, a discontinuity comprising glass positioned in said channel, the angle of incidence of signal waves traveling in said mercury on said glass being less than the critical angle, and output means cooperating with said channel and adapted to be energized by signals reflected from said discontinuity.

6. A signal translation device comprising a confined signal wave translation channel comprising mercury having signal input means cooperating therewith, a discontinuity comprising glass positioned in said channel, the angle of incidence of signal waves from said input means traveling in said mercury and impinging on said glass being less than fifteen degrees, and output means cooperating with said channel and adapted to be energized by signals reflected from said discontinuity.

HAROLD N. BEVERIDGE.

References Cited in the file of this patent

UNITED STATES PATENTS

| Number | Name | Date |
|---|---|---|
| 2,263,902 | Percival | Nov. 25, 1941 |
| 2,505,364 | McSkimin | Apr. 25, 1950 |
| 2,540,720 | Forbes et al. | Feb. 6, 1951 |